US010814297B2

(12) United States Patent
Sailer et al.

(10) Patent No.: US 10,814,297 B2
(45) Date of Patent: *Oct. 27, 2020

(54) AGRICULTURAL FEED MIXER WITH INGREDIENT SENSING AUTOMATIC TRANSMISSION CONTROL

(71) Applicant: Patz Corporation, Pound, WI (US)

(72) Inventors: Anthony H. Sailer, Pound, WI (US); Darrell Patz, Coleman, WI (US); Bradley Bedord, Crivitz, WI (US)

(73) Assignee: Patz Corporation, Pound, WI (US)

( * ) Notice: Subject to any disclaimer, the term of this patent is extended or adjusted under 35 U.S.C. 154(b) by 951 days.

This patent is subject to a terminal disclaimer.

(21) Appl. No.: 15/257,371

(22) Filed: Sep. 6, 2016

(65) Prior Publication Data

US 2017/0067556 A1 Mar. 9, 2017

Related U.S. Application Data

(60) Provisional application No. 62/214,653, filed on Sep. 4, 2015, provisional application No. 62/214,654, filed
(Continued)

(51) Int. Cl.
*B01F 15/00* (2006.01)
*F16H 61/02* (2006.01)
(Continued)

(52) U.S. Cl.
CPC ........ *B01F 15/00201* (2013.01); *A01K 5/001* (2013.01); *A01K 5/004* (2013.01);
(Continued)

(58) Field of Classification Search
CPC .......... B01F 15/00201; B01F 15/00253; B01F 15/00376; B01F 15/00409;
(Continued)

(56) References Cited

U.S. PATENT DOCUMENTS 5,462,354 A * 10/1995 Neier ...................... B01F 7/245
366/314
5,465,914 A * 11/1995 Faccia ...................... B01F 7/24
241/101.2

(Continued)

FOREIGN PATENT DOCUMENTS

WO 2016/009098 A1 * 1/2016

OTHER PUBLICATIONS

Pottinger—Torro Combiline Brochure—https://www.poettinger.at/download/prospekte/POETTINGER_TORRO-COMBILINE-_128.EN.1015.pdf; 2016.

*Primary Examiner* — Charles Cooley
(74) *Attorney, Agent, or Firm* — Nicholas A. Kees; Godfrey & Kahn, S.C.

(57) ABSTRACT

A feed mixer apparatus that includes a mixing chamber for receiving feed material, and having a mixing element situated therein for mixing the feed material; a transmission having a plurality of gears and connected with a mixing element; a control unit having a display and a plurality of control panel inputs, wherein the control unit is in at least indirect communication with the transmission and the sensors, and wherein the control unit receives a plurality of outputs from one or more of the transmission and sensors, and based at least in part on the plurality of outputs, provides an output command to effectuate a gear change in the transmission, and wherein the control unit includes a processor, a memory, and a control program.

8 Claims, 4 Drawing Sheets

Related U.S. Application Data on Sep. 4, 2015, provisional application No. 62/214,650, filed on Sep. 4, 2015, provisional application No. 62/298,240, filed on Feb. 22, 2016.

(51) Int. Cl.

| | | |
|---|---|---|
| *F16H 57/025* | (2012.01) | |
| *A01K 5/00* | (2006.01) | |
| *A01K 5/02* | (2006.01) | |
| *B60K 25/02* | (2006.01) | |
| *B01F 13/00* | (2006.01) | |
| *B01F 7/24* | (2006.01) | |
| *G01L 3/10* | (2006.01) | |
| *G01L 3/14* | (2006.01) | |
| *G05B 19/042* | (2006.01) | |
| *G05D 17/02* | (2006.01) | |
| *G05B 15/02* | (2006.01) | |
| *G05D 9/12* | (2006.01) | |
| *G05D 17/00* | (2006.01) | |

(52) U.S. Cl.
CPC .......... *A01K 5/02* (2013.01); *B01F 7/24* (2013.01); *B01F 13/004* (2013.01); *B01F 15/0048* (2013.01); *B01F 15/00155* (2013.01); *B01F 15/00188* (2013.01); *B01F 15/00311* (2013.01); *B01F 15/00538* (2013.01); *B60K 25/02* (2013.01); *F16H 57/025* (2013.01); *F16H 61/0204* (2013.01); *F16H 61/0206* (2013.01); *G01L 3/108* (2013.01); *G01L 3/1478* (2013.01); *G05B 15/02* (2013.01); *G05B 19/042* (2013.01); *G05D 9/12* (2013.01); *G05D 17/00* (2013.01); *G05D 17/02* (2013.01); *B01F 2015/00623* (2013.01); *B01F 2015/00629* (2013.01); *B01F 2215/0008* (2013.01); *B60K 2025/024* (2013.01); *G05B 2219/41358* (2013.01); *G05B 2219/49197* (2013.01); *G05B 2219/49255* (2013.01)

(58) Field of Classification Search
CPC .......... B01F 15/00428; B01F 15/00318; B01F 15/00311; B01F 15/00922; B01F 13/004; B01F 15/00194; B01F 15/00129; B01F 2215/0013; B01F 7/00; B01F 2215/0008; B01F 15/00831; B01F 15/00331; B01F 7/00933; B01F 7/08; B01F 7/24; B01F 7/242; B01F 7/245; B01F 15/0295; B01F 15/00188; B01F 15/00155; B01F 15/00538; B01F 15/0048; B01F 2015/00629; B01F 2015/00623; G05B 23/0264; G05B 2219/24084; G05B 2219/24067; G05B 2219/31462; G05B 2219/2663; G05B 2219/24015; G05B 2219/24055; G05B 15/02; G05B 19/042; G05B 2219/49197; G05B 2219/41358; G05B 2219/49255; G07C 5/008; G08B 21/182; A01K 5/00; A01K 5/001; A01K 5/004; A01K 5/0001; A01K 5/0208; A01K 5/02; A01B 76/00; A01C 7/20; G01L 3/1478; G01L 3/108; G05D 17/00; G05D 9/12; G05D 17/02; F16H 61/0204; F16H 57/025; F16H 61/0206; F16H 61/0213; B60K 25/02; B60K 2025/024; B60K 17/28; B60Y 2200/22

See application file for complete search history.

(56) References Cited

U.S. PATENT DOCUMENTS

| | | | | |
|---|---|---|---|---|
| 6,758,426 | B2 * | 7/2004 | Have | A01K 5/004 241/101.2 |
| 7,341,372 | B2 * | 3/2008 | Van Der Plas | A01K 5/004 366/141 |
| 8,651,730 | B2 * | 2/2014 | Barbi | A23N 17/007 119/51.01 |
| 8,657,485 | B2 * | 2/2014 | Neier | A01K 5/004 366/297 |
| 8,770,826 | B2 * | 7/2014 | Tamminga | B01F 7/245 366/314 |
| 8,850,910 | B1 * | 10/2014 | Have | F16H 3/66 241/32 |
| 8,960,995 | B2 * | 2/2015 | McCurdy | A01K 5/002 366/141 |
| 8,960,996 | B2 * | 2/2015 | McNab Kerr | A23K 50/10 366/141 |
| 9,010,991 | B2 * | 4/2015 | McFarlane | B01F 7/085 366/270 |
| 9,751,058 | B2 * | 9/2017 | Bedord | A01K 5/004 |
| 10,495,192 | B2 * | 12/2019 | Bondioli | A01K 5/004 |
| 10,499,680 | B2 * | 12/2019 | Rowntree | B01F 15/00389 |
| 2002/0179757 | A1 * | 12/2002 | Have | B01F 15/00435 241/101.2 |
| 2005/0172741 | A1 * | 8/2005 | Van Der Plas | A01K 5/004 74/336 R |
| 2006/0050604 | A1 * | 3/2006 | Brunazzi | A01K 5/001 366/20 |
| 2006/0256647 | A1 * | 11/2006 | Van Der Plas | A01K 5/004 366/141 |
| 2009/0238032 | A1 * | 9/2009 | McFarlane | B01F 7/085 366/270 |
| 2011/0064865 | A1 * | 3/2011 | McCurdy | A01K 5/002 426/623 |
| 2011/0112688 | A1 * | 5/2011 | McCurdy | A01K 5/002 700/265 |
| 2011/0261641 | A1 * | 10/2011 | Barbi | A23N 17/007 366/141 |
| 2012/0008457 | A1 * | 1/2012 | Neier | A01K 5/004 366/190 |
| 2012/0065759 | A1 * | 3/2012 | Kerr | A23K 50/10 700/103 |
| 2012/0069700 | A1 * | 3/2012 | Tamminga | B01F 7/245 366/314 |
| 2016/0129408 | A1 * | 5/2016 | Peeters | B01F 13/004 366/297 |
| 2016/0143249 | A1 * | 5/2016 | Peeters | B01F 7/24 241/36 |
| 2016/0339405 | A1 * | 11/2016 | Bump | B01F 13/004 |
| 2016/0339406 | A1 * | 11/2016 | Bump | B01F 13/004 |
| 2016/0343231 | A1 * | 11/2016 | Bump | B01F 13/004 |
| 2017/0065948 | A1 * | 3/2017 | Bedord | G05D 17/02 |
| 2017/0067556 | A1 * | 3/2017 | Sailer | A01K 5/004 |
| 2017/0068259 | A1 * | 3/2017 | Patz | F16H 61/0213 |
| 2017/0167580 | A1 * | 6/2017 | Bondioli | F16H 3/72 |
| 2018/0255823 | A1 * | 9/2018 | Rowntree | A23N 17/007 |
| 2019/0366287 | A1 * | 12/2019 | Rowntree | F16H 61/462 |
| 2020/0056681 | A1 * | 2/2020 | Bondioli | A01K 5/004 |
| 2020/0077694 | A1 * | 3/2020 | Rowntree | B01F 7/241 |

* cited by examiner

AGRICULTURAL FEED MIXER WITH INGREDIENT SENSING AUTOMATIC TRANSMISSION CONTROL

CROSS-REFERENCE TO RELATED APPLICATIONS

This application claims priority from U.S. Provisional Patent Application Ser. No. 62/214,653, filed on Sep. 4, 2015, U.S. Provisional Patent Application Ser. No. 62/214,654, filed on Sep. 4, 2015, U.S. Provisional Patent Application Ser. No. 62/214,650, filed on Sep. 4, 2015, and U.S. Provisional Patent Application Ser. No. 62/298,240, filed on Feb. 22, 2016, all of which are incorporated herein by reference for all purposes.

FIELD OF THE INVENTION

This invention relates to the field of agricultural feed mixers and the means of which to drive/transmit and control power from the main power source to at least one mixing element or screw.

BACKGROUND

Agricultural feed mixers, often termed Total Mixed Ration (TMR) Mixers, have a goal of providing a homogenous mixture of ingredients that constitute a ration to be fed to livestock for maximum production, whether that production is milk or meat.

There are known methods of controlling the transmission of power from the main power source, usually a tractor engine, connected to the mixing element(s) of a livestock feed mixer by means of a power-take-off (PTO) shaft. Traditionally this had been done by using a direct drive connection from the tractor engine, through the PTO shaft, to the mixing elements. Variation in the speed of the mixing elements in a direct drive arrangement is achieved by varying the speed of the engine of the tractor. The advent of larger systems and the attendant increase in power demand brought about the use of a multi-speed gearbox (transmission) having at least two speed ranges or ratios, where a first speed produces a lower output speed than a second speed, but requires less power. One known method of selecting or shifting between the first speed and the second speed is by manual actuation of a shift lever. This method forces the operator to stop the PTO shaft, manually shift the lever to change gears, and then engage the PTO shaft again with the transmission in the different gear, to resume mixing at a different speed. This method wastes time for the operator and reduces the efficiency of the mixing process. This solution also relies on the operator to decide to shift the gearbox at an appropriate time, so as to avoid damage to the drive system components (tractor, engine, drivelines, multi-speed gearbox, mixing element gearbox/reducers), by exceeding their designed loading limits. For an operator, some of the primary indications of the magnitude of loading on these components are visual cues of how full the mixing chamber is, the weight inside the mixing chamber if equipped with a scale system, and possibly an audible cue of the strain on the main power source, such as the tractor engine.

A feed mixer equipped with a weight responsive transmission for example is described in U.S. Pat. No. 7,341,372. The transmission described there is an automatically shifting transmission, which includes a control system that shifts the gearbox based on the total weight in the mixing chamber. This method of using weight of the feed in the mixing chamber as the main input for controlling the transmission ratio is not an efficient way to prevent damage to the drive system components because the weight in the mixing chamber is not a reliable indication of loading on the drive components. The loading on the drive components can be calculated by knowing the power requirements. To know the power requirement, it is necessary to know the torque requirement and the speed at the mixing element. The feed mixer of the '372 patent is directed to relating weight in the mixer to the torque requirement at the mixing element. In a general sense, as weight increases, so should torque, especially if density of the mixing material is constant and the mixing volume is constant. This solution becomes problematic, however, in a feed mixer application when the density of one feed ingredient does not match the density of another feed ingredient. It is possible, and common, that an ingredient, such as silage, loaded into the mixer on one day has a different density than the same silage ingredient the next day, due to changes in moisture content. The difference in density between ingredients is especially true when ingredients with very different densities, such as silage, ground corn, protein, pizza crust, haylage, etc., make up the recipe or ration, and all are being mixed at one time. A wide diversity of feed types is very commonly used in a feed mixer, at least for certain rations. Thus, if the densities are not the same, then the same weight is filling a different volume, ultimately resulting in a different loading or torque requirement.

U.S. Pat. No. 5,462,354 (the '354 patent) discloses a livestock feed mixer directed to the use of an automatic transmission to deliver power from the primary mover to the mixing element of a feed mixer. The transmission described, a Central Detroit Diesel-Allison Inc. AT-545, is a conventional truck automatic transmission. It is an object of feed mixer disclosed in the '354 patent to provide a transmission system which will efficiently drive the mixing process as well as protect the drive train components. The solution presented falls short of its goals in both driving the mixing elements in an efficient way and effectively protecting the drive train components. It is desired, in the application of a feed mixer, to complete the task of mixing ingredients as fast as possible to reduce valuable time. The truck transmission described in the '354 patent is shifted in response to changes in the output speed of the transmission. Many times this style of transmission will force itself into a lower gear (i.e., speed range), when in fact the primary mover has sufficient horsepower to drive the unit at a higher speed. Systems such as this have the disadvantage of very long processing time, which for the application of a feed mixer, is considered a loss of efficiency. Additionally, the transmission described does not support safeguards to prevent a condition which would find the transmission in a "sour spot" (opposite of a "sweet spot") that causes the transmission to repetitively shift back and forth between a lower gear and a higher gear. Due to the nature of various mixing materials, rapid changes in the torque required to do the mixing, and in the resulting output speed of the mixer, may occur. An example is when a large round hay bale is added to the mixer. An ingredient such as that may have a solidly compact core and may produce large spikes in power demand as the bale is caught between the mixing element and the side wall of the mixing chamber. For the transmission described in the '354 patent, the transmission may detect a spike and shift to a lower gear, and when the spike is gone, it may then shift back to a higher gear. This constant shifting back and forth will produce extensive stress and wear on the drive train components, including the transmission itself.

SUMMARY OF THE INVENTION

An object of the invention is to provide a feed mixer equipped with the capability for programming different batches (recipes, rations). These batches dictate, and provide control input to, a control unit that automatically shifts the transmission between speeds (gears).

Another object of the invention is to provide a feed mixer with a control unit that monitors the vital operating condition of the transmission's input and/or output speed, oil temperature, and oil pressure to automatically control the shifting between speeds (gears) by comparing the operating condition of these parameters to predetermined operating limits. It should be known that the vital operating conditions are not limited to the examples given; other vital transmission data may be used.

Another object of the invention is to provide a feed mixer with a control unit that gives the operator flexibility to choose between operating or controlling or shifting the transmission in a "hands off" automatic manner or a failsafe semi-manual manner.

Yet another object of the invention is to provide a feed mixer with a control unit that automatically, and efficiently, prevents damage to the drive and transmission.

Still another object of the invention is to provide a feed mixer with a control unit that automatically, and efficiently, produces a fully mixed and broken down batch based on input provided by a batch recipe.

Still yet another object of the invention is to provide a feed mixer apparatus that includes a mixing chamber for receiving feed material, and having a mixing element situated therein for mixing the feed material; a transmission having a plurality of gears and connected with a mixing element; a control unit having a display and a plurality of control panel inputs, wherein the control unit is in at least indirect communication with the transmission and the sensors, and wherein the control unit receives a plurality of outputs from one or more of the transmission and sensors, and based at least in part on the plurality of outputs, provides an output command to effectuate a gear change in the transmission, and wherein the control unit includes a processor, a memory, and a control program.

A further object of the invention is to provide a method for generating a control cycle for gear control of a transmission of a feed mixer having at least one mixing chamber, the method comprising: initiating a learning mode of a control program; receiving a cycle identifier; receiving a number value representing the number of successive feed ingredients to be added to the mixing chamber during the cycle; starting a prime mover and engaging a power-take-off shaft interconnected with a transmission; receiving a transmission speed signal and comparing with a predetermined shift speed signal, and if the transmission speed signal is greater than the predetermined shift speed signal, then communicating an upshift command to the transmission to change to a higher gear; receiving an indication that a subsequent ingredient is being added to the mixing chamber and increment an ingredient number value in an ingredient register so as to be consistent with the current number of the successive ingredients being added; receiving an indication to store the ingredient number value in the ingredient register as a first shift point indicator value; at least one of, identifying that all ingredients have been added to the mixing chamber, and receiving an indication that all ingredients have been added; unloading the mixed ingredients from the mixing chamber; disengaging the power-take-off shaft; receiving an indication that the transmission speed signal is less than a predetermined minimum stop speed; and identifying the control cycle as complete.

A still further object of the invention is to provide a method for executing a pre-programmed control cycle for shifting gears in a feed mixer transmission comprising: selecting a pre-programmed control cycle for operating a feed mixer during preparation of a batch recipe having a plurality of ingredients; detecting an input by a control unit indicating the start of the control cycle; starting a prime mover and engaging a power-take-off shaft interconnected with a feed mixer transmission to rotationally engage the transmission; receiving a transmission speed signal and comparing with a predetermined minimum engagement speed signal, and if the transmission speed signal is greater than the predetermined minimum engagement speed signal, then communicating a shift command to the transmission to change to a higher gear; sequentially loading the plurality of ingredients into a mixing chamber, while incrementing the numerical value stored in an ingredient register upon receipt of a signal from at least one of a user and a scale indicator, indicating a subsequent ingredient is being loaded; and comparing the numerical value stored in an ingredient register with a first shift point indicator value associated with the selected pre-programmed control cycle, if the numerical value stored in an ingredient register is greater than the first shift point indicator value, then communicating a shift command to the transmission to change to a lower gear.

A yet still further object of the invention is to provide a method for shifting gears in a transmission of a feed mixer, the method comprising: receiving a speed signal from a speed sensor indicating a rotational speed of at least one of a transmission input shaft and a transmission output shaft; sending a shift command to the transmission to shift into a lowest gear upon receiving an indication from the speed sensor that the rotational speed is substantially zero; receiving a transmission temperature signal and comparing to a pre-determined maximum operating temperature; receiving a transmission oil pressure signal and comparing to a pre-determined minimum operating pressure; providing an indication that a transmission gear shift is allowable upon sensing that the rotational speed is greater than a pre-determined minimum speed, the transmission temperature is below the pre-determined maximum temperature, and the transmission oil pressure is above a pre-determined minimum pressure; and sensing if a transmission gear shift has occurred, and if so then sending a command to shift the transmission to a lower gear if either the transmission temperature signal exceeds the pre-determined maximum operating temperature, or if the transmission oil pressure signal is less than the pre-determined minimum operating pressure.

DETAILED DESCRIPTION

The term "feed mixer" is used in general throughout this description and an exemplary vertical feed mixer is specifically shown, to demonstrate the effectiveness of the invention. The term feed mixer, however, applies to any agricultural feed mixing apparatuses, including but not limited to reel mixers, horizontal mixers, and any other agricultural feed mixers. The term "feed" is here on defined as material used and mixed for consumption by animals, although in some embodiments, other types of materials can be deposited in the apparatus for mixing, including non-consumable materials. As such, the system and methods of operation described herein are equally applicable to various other types of machines used to load, mix, and unload materials of various types, and it is to be understood that various terms used throughout shall be interpreted broadly, for example, the term "ingredients" is not limited to consumable materials, but can include any type of material, such as pesticides, seeds, etc.

Figure 1:
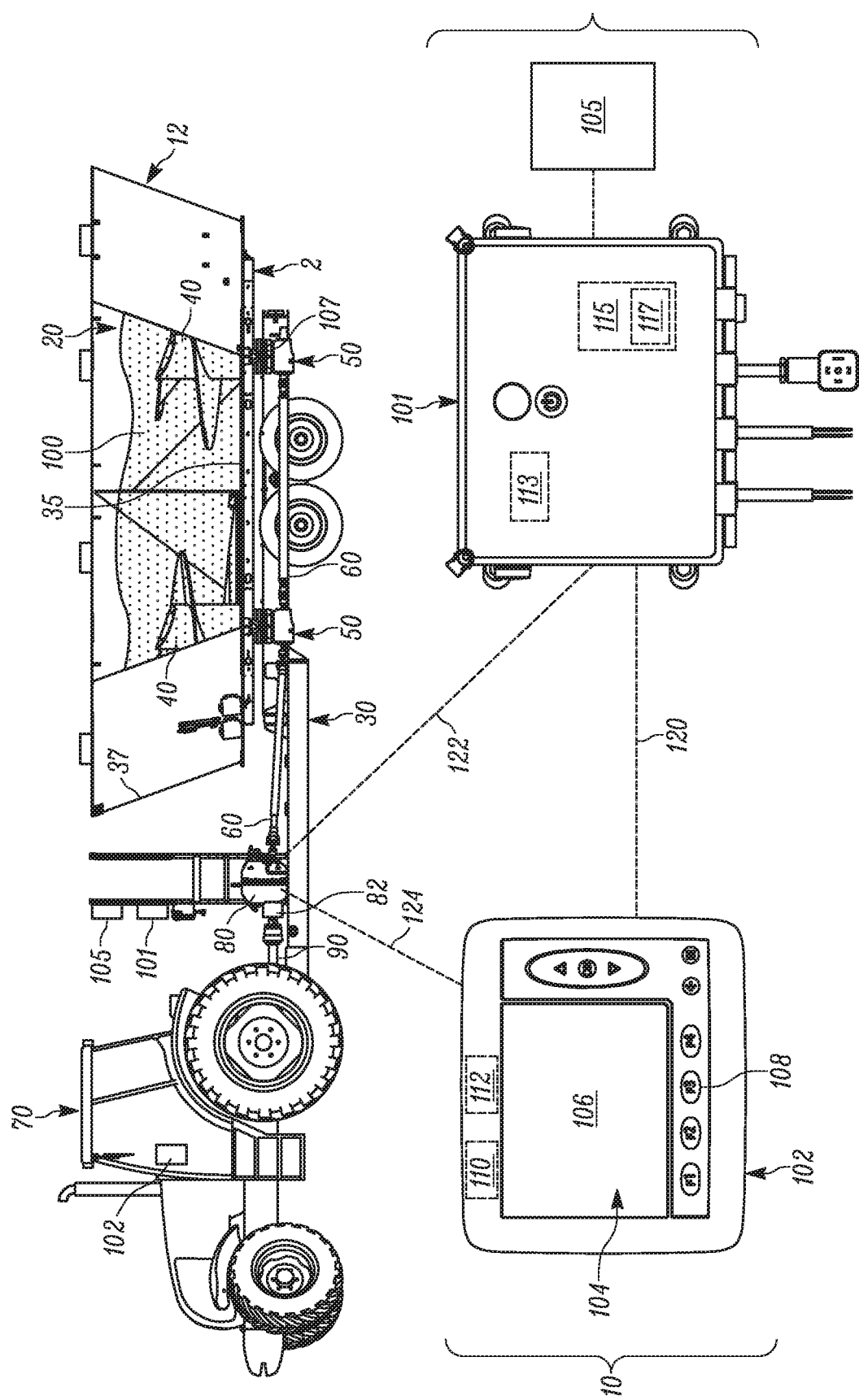
FIG. 1 shows a side elevation view of exemplary feed mixer attached to a tractor, and equipped according to the invention in a schematic representation, illustrated with some structural elements removed for illustrative purposes.

FIG. 1 shows a feed mixer 12 equipped with the invention in a partially schematic representation. Feed mixer 12 includes a frame 30 (i.e., chassis) which supports a mixing chamber 20 thereon. Mixing chamber 20 includes a mixing chamber floor 35 and mixing chamber inner walls 37 extending upwards therefrom. Inside mixing chamber 20 resides at least one mixing element 40. Mixing element 40 completes the work of mixing ingredients that have been placed within mixing chamber 20 and that contribute to feed 100. Mixing element 40 can include one or more of various known structures used for mixing inside a feed mixer 12, such as an auger, which is rotatable and transfers its load through an angular gearbox 50 (e.g., planetary) which is connected by common drive shafts 60 as part of a driveline. The load in the driveline is transferred a transmission 80 (e.g., power-shift, automatic, or, multi-gear, etc.) that is connected to a prime mover 70 (e.g., tractor, diesel engine, electric motor, hydraulic motor etc.). Connection between prime mover 70 and transmission 80 is described as being through a PTO shaft 90, although in other embodiments, the connection can be made through other methods, such as belt and pulleys, stub shafts, hydraulic couplings, etc.

Feed mixer 12 includes a control unit 10 which controls the speed range (gear ratio (multiples of which are hereafter referred to as "gears")) used by transmission 80 in one or more of various selectable modes, such as a Semi-Manual Mode and a Custom Automatic Control Mode. Control unit 10 includes a control box 101 and a controller 102, and in some embodiments, a secondary control panel, such as a scale indicator 105, wherein feed mixer 12 can also be equipped with one or more weight sensor(s) 107 (e.g., scale), and wherein scale indicator 105 is in communication with weight sensor 107. Weight sensor 107 is positioned and configured for measuring the weight of feed 100 in mixing chamber 20, and communicating with scale indicator 105. In at least some embodiments, scale indicator 105 is a Model No. Stad 04 Plus, as manufactured by Dianmica Generale, located in Poggio Rusco MN, Italy. Scale indicator 105 provides digital inputs representing the ingredient (ration) variables including what ingredient the recipe (ration) is on based on the weight sensed. Scale indicator 105 can include the ability to program a plurality of recipes (i.e., rations) consisting of a multitude of ingredients, for example, a first exemplary recipe entitled "Dry Cows" can include the following: Ingredient (1)="Chopped Straw"; Quantity=(2,000 lbs); Ingredient (2)="Gluten"; Quantity=(500 lbs); Ingredient (3)="Alfalfa"; Quantity=(500 lbs); Ingredient (4)="Corn Silage" Quantity=(7,000 lbs). In addition, another exemplary recipe entitled "Dairy Cows" can include the following: Ingredient (1)="Canola"; Quantity=(1,000 lbs); Ingredient (2)="Chopped Straw"; Quantity=(750 lbs); Ingredient (3)="Grass Hay"; Quantity=(1,500 lbs); Ingredient (4)="Gluten"; Quantity=(1,200 lbs); Ingredient (5)="Corn Silage"; Quantity=(12,000 lbs).

Control unit 10 can be a singular unit that performs all the functions described below for each of controller 102 and control box 101, or it can be comprised of discrete units each forming the respective functions described with reference to controller 102 and control box 101. As such, any functions described or associated with either controller 102 and control box 101 can be performed by control unit 10, and any components (e.g., control panel 104) associated therewith are also considered part of control unit 10, whether integrated or discrete. When controller 102 and control box 101 are discrete units, they can be located together or separate in various locations, such as, inside the cab of the prime mover 70, adjacent transmission 80, on feed mixer 12, etc. Control unit 10 along with the various described sensors, form a control system. In at least some embodiments, controller 102 includes a control panel 104 and a display 106. Control panel 104, which can also be incorporated, in whole or in part, into display 106 by any suitable means such as a touchscreen interface, can include one or more user selectable control panel inputs 108 (e.g., buttons, switches, etc.) for navigating by an operator, various control options for control unit 10. In at least some embodiments, controller 102 includes a processing component 110 (e.g., a processor) and a memory component 112 (e.g., RAM, ROM, etc.), for operating display 106, processing user provided control panel inputs 108, and communicating signals to and from control box 101, scale indicator 105, and transmission 80, based at least on one or more received inputs.

In at least some embodiments, control box 101 includes a processing component 113 (e.g., processor) and memory component 115 for storing one or more control programs 117. In at least some embodiments, the processing component is a programmable logic controller (PLC), although in some other embodiments, various other known programmable-type controllers or processors can be utilized. A primary communication link 120 between control box 101 and controller 102, as well as a secondary communication link 122 between the control box 101 and transmission 80, can be achieved using one of or a combination of, various known means, such as wired (e.g., Ethernet cabling, CAN-BUS, Profi-BUS, Fiber-optic, etc.) or wireless (e.g., Wi-Fi, WLAN, Bluetooth, etc.) connection. Additionally, in at least some embodiments, a third communication link 124 can be provided between control panel 104 and transmission 80. Further, one more similar type communication links can be provided between scale indicator 105 and control unit 10.

Control box 101 receives data from transmission 80, among other things. More particularly, transmission 80 includes one or more known types of sensors that monitor the pressure, input speed, and temperature of transmission 80 (e.g., oil pressure, oil temperature, etc.). This transmission data can be communicated directly to control box 101 and/or controller 102. The transmission data, along with other data, as discussed below, allow for control program 117 to be implemented in control unit 10 which identifies or calculates the appropriate transmission shift points to control which gear (i.e., speed range) transmission 80 utilizes at a given time. Control box 101 determines and initiates the changing of gears in transmission 80 to achieve a desired speed range to effectively protect the drive system by not allowing the drive system to operate in a potentially damaging state (e.g., overloaded). In at least some embodiments, the drive system is comprised of, at least in part, transmission 80, prime mover 70, PTO shaft 90, drive shafts 60, angular gearbox 50, and mixing elements 40. In addition, control program 117 allows for mixing processes to occur in a highly efficient and customized manner without necessary operator intervention. It is to be noted that control program 117 can be stored and operated in controller 102 or in control box 101. In addition, any and all inputs and outputs discussed herein can be communicated to any one of controller 102, control box 101, and scale indicator 105.

In at least some embodiments, control unit 10 is utilized to receive or select a batch recipe and track the progress of the batch loading process in a manner that allows for accurate batching of ingredients as well as suitable control of transmission 80 during the loading and unloading process. A batch recipe can include one or more of various types of feed, which are loaded into feed mixer 12 and mixed together for dispersement. Such batch recipes can be pre-programmed in scale indicator 105, as well as loaded into either memory component of control box 101 and controller 102 (e.g., memory component 112, 115), although in some embodiments, the batch recipes can be programmed using controller 102 or control box 101, or can be a new recipe not yet programmed, but involving the mixture of various ingredients.

As noted above, one or more of various modes can be provided. These modes can be selected at control panel 104 and provide varying operational benefits that are suitable for specific loading and unloading of feed. The various modes can include a Semi-Manual Mode and a Custom Automatic Control Mode, as described in greater detail below.

Semi-Manual Mode

Figure 2:
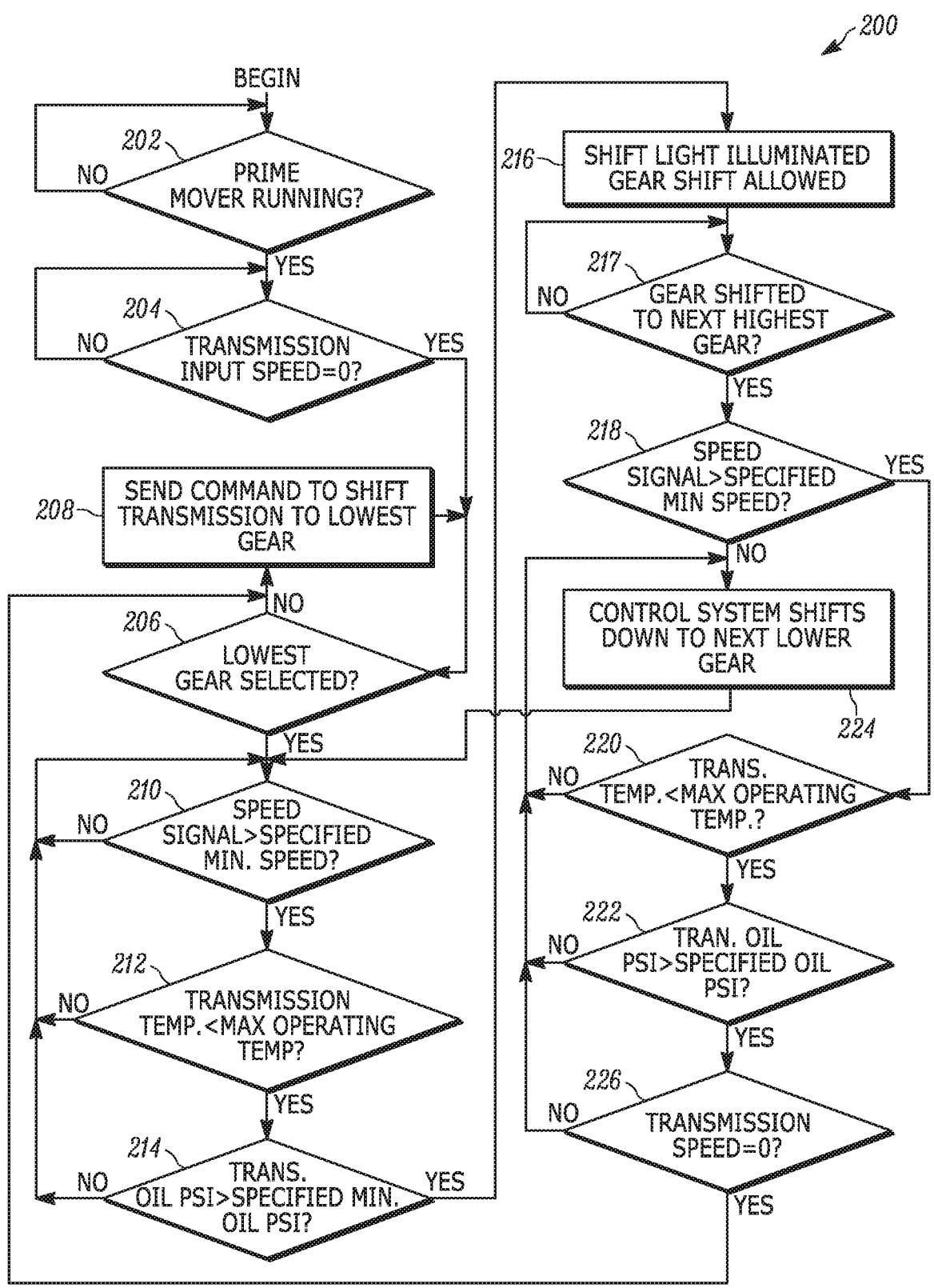
FIG. 2 is a flow chart illustrating an exemplary process for operating the feed mixer in a Semi-Manual Mode.

It will be beneficial to a user to operate in a Semi-Manual Mode when mixing new or uncommon batches of feed that may not have a specific recipe (combination of different ingredients having different properties). In this case the user may want to experiment with the shift points at which transmission 80 is shifted, because the user may not yet know how full mixing chamber 20 will be when a shift is desired or required. An exemplary process of operating feed mixer 12 in Semi-Manual Mode will now be described with reference to flow chart 200 of FIG. 2.

Beginning at step 202, a user starts prime mover (tractor) 70, and control unit 10 checks if prime mover 70 is running, then at step 204, checks the speed signal (e.g. signal outputted from a known in the art speed sensor, for example speed sensor 82, capable of sensing the rotational speed of a drive system component, such as a transmission input shaft speed, transmission output shaft speed, etc.) for transmission 80 (or another drive system component). If the speed signal is zero, then at step 206, control unit 10 checks if transmission 80 is in its lowest drive gear (first gear). If not in first gear, then at step 208, a command is sent to transmission 80 to change to first gear.

Once transmission 80 is confirmed being in first gear, the user engages PTO shaft 90 allowing power to transfer through the drive system components and commence movement of mixing element(s) 40, generating a speed signal from transmission 80 that is representative of the rotational speed of the transmission input or output. In at least some embodiments, the speed signal can be obtained from other moving components, such as a rotation sensor on the driveline (e.g., drive shafts 60).

At step 210, the now-running speed signal received from transmission 80 is compared with a specified (i.e., predetermined) minimum speed signal. If the running speed signal becomes greater than the specified minimum speed for clutch engagement of transmission 80, then at step 212, the transmission temperature signal (e.g., oil temperature) received by the control box 101 from transmission 80, is compared with a specified (i.e., predetermined) maximum operating temperature for transmission 80, and if the temperature signal is less than the specified maximum operating temperature, the process continues to step 214. At step 214, the transmission pressure signal (e.g., transmission oil pressure) received from transmission 80 is compared with a specified (i.e., predetermined) minimum operating pressure signal for transmission 80. Once the running speed signal exceeds the specified (i.e., predetermined) minimum input speed signal in step 210, the transmission temperature is below the specified maximum operating temperature at step 212, and the transmission oil pressure signal is above the specified minimum operating oil pressure at step 214, then the process moves to step 216, where an indicator light is displayed to the user (e.g., via controller 102) that alerts the user that manual shifting is allowed. The user manually shifts transmission to the next higher speed range (gear) by pressing a control panel input 108 on control panel 104, or by actuation of another component of control unit 10. At step 217, control unit 10 checks if the transmission 80 has been shifted by the user to the next highest gear. Transmission 80 will remain in this next higher gear as long as the speed signal, temperature signal, and pressure signal, sensed by control unit 10, stay within their specified limits, as noted in steps 218, 220, and 222. If at any time one of these parameters falls outside of the allowed limits, the process moves to step 224, where control unit 10 automatically shifts the transmission 80 down to a lower gear. The process then returns to step 210.

It is sometimes desired by the user to mix the ingredients as fast as possible to save time. In that case, the user would continue to manually advance gears in the same fashion described above until the maximum speed range (highest gear) is achieved. The user then begins loading mixing chamber 20 with various ingredients until the desired feed mix is achieved. As the user loads mixing chamber 20, control unit 10 continues to monitor pressure, temperature, and speed. It is likely the case that, as the user reaches the maximum capacity of mixing chamber 20, the drive system will be taxed and the user can manually finish the mixing/filling process in a lower gear than had been used at the beginning. The lower gear is selected by the user pressing a control panel input 108 on control panel 104, or by actuation of another component of control unit 10.

Once the feed 100 is fully mixed, the user could then move feed mixer 12 to an unloading location, where the user begins discharging the now-mixed feed 100 from mixing chamber 20. As feed 100 exits mixing chamber 20, the load on transmission 80 will be reduced, thereby allowing the user to manually shift to a higher gear without overtaxing transmission 80. Once the ingredients have been unloaded, the user will disengage PTO shaft 90. During the loading and unloading process, if the transmission speed drops to zero as evaluated at step 226, then the process moves to step 208, causing control unit 10 to shift transmission 80 to its lowest gear.

Custom Automatic Control Mode

In many situations, Custom Automatic Control Modes can be utilized to provide a user efficient control for repetitious mixing. For example, when feed mixer 12 will be used to deliver feed batches day after day based on feed rations (i.e. batch recipes) designed specifically for the animals that are being fed, such as milking cows, dry cows, heifers, or beef cattle, it will be desired to set up Custom Automatic Control Modes to provide some automation to the process of feeding. A user may have numerous different feed rations that may be implemented on the farm on a daily basis. For example, on a dairy farm, to achieve maximum milk production and optimize the utilization of feed materials, a different feed ration will be needed for milking cows (dairy ration), dry cows (dry cow ration), and young stock (heifer ration). These feed rations will vary greatly in the types and amounts of ingredients. Due to the different types and amounts of ingredients per feed ration, a different mixing speed and mixing duration will be required for each feed ration. Additionally, different ingredients will have a different density which in turn means that a particular amount of a certain ingredient may have a different weight than that of another ingredient. The Custom Automatic Control Mode allows the user to program a number of different custom cycles using control panel 104. Each cycle will have at least one user settable shift point (speed range change) based on where in the batch recipe (ration) the user is operating, by inputting an ingredient number signal into control unit 10. During the loading process there is a shift down (lower speed range) point, and during the discharge process there is a potential shift up (higher speed range) point. In at least some embodiments, when transmission 80 has more than two gears, there can be additional shift down and shift up points use in accordance with the processes described herein. During a custom automatic cycle the same ultimate safety conditions as described in the Semi-Manual Mode hold true: speed, temperature, and pressure must all be within their predefined limits for transmission 80 to operate in any speed range (gear) other than the lowest speed range (gear).

Figure 3:
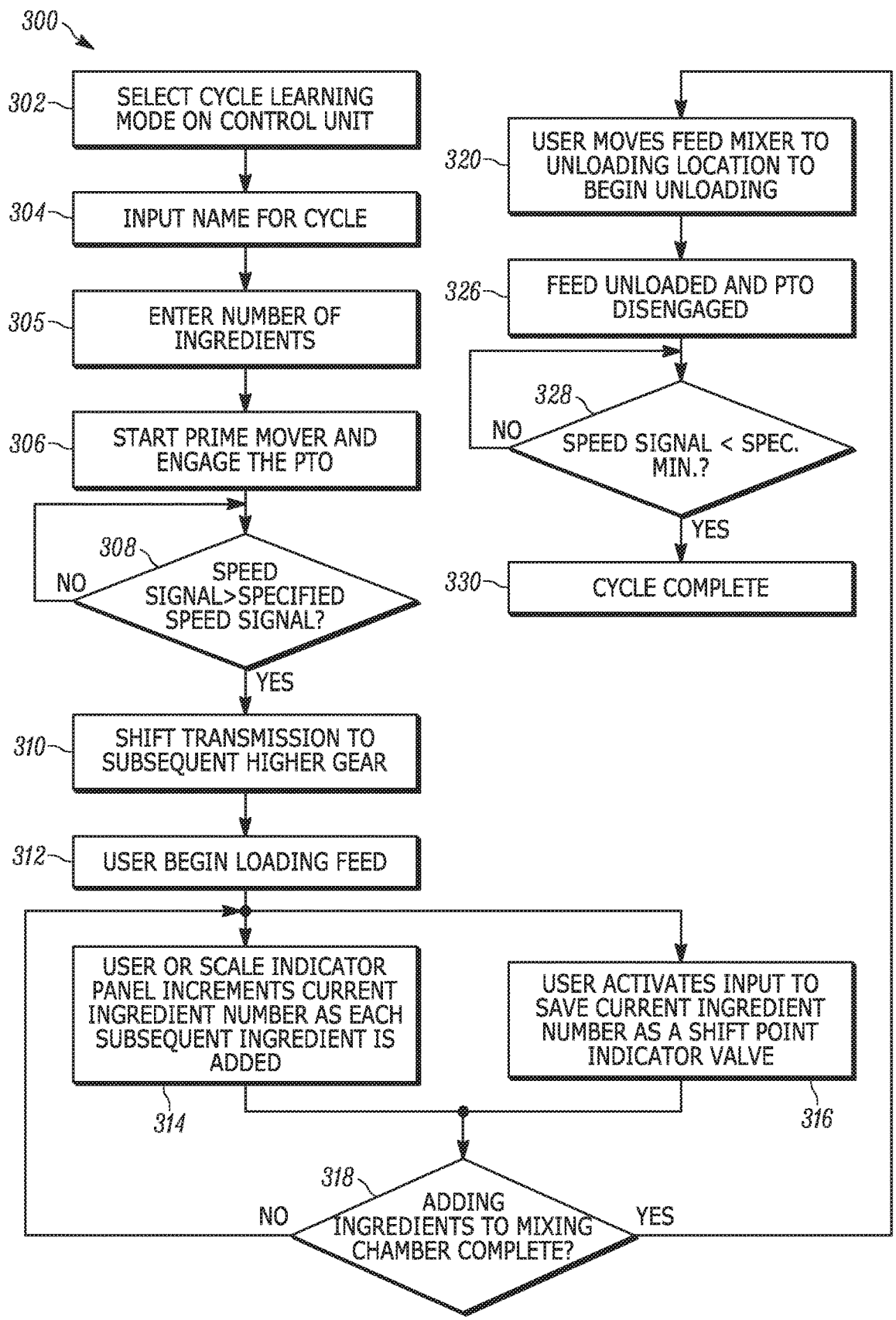
FIG. 3 is a flow chart illustrating an exemplary process to program a Custom Automatic Control Mode.

To program a custom cycle for Custom Automatic Control Mode, the user follows the steps provided in the exemplary flow chart 300 shown in FIG. 3. Beginning at step 302, the user puts control unit 10 into a "Cycle Learning Mode" by selecting the mode via control panel 104. At step 304, the user gives the cycle a specific name, for example "Dairy Ration" using control panel 104. Then at step 305, the user is prompted by control panel 104 to enter the number of ingredients being used for this batch recipe. For example if the user's batch recipe consisted of liquid fat, high moisture corn, silage, haylage, and minerals, the user would enter the number "5". This information can also be provided via scale indicator 105, if available. The user would then start prime mover 70 and engage PTO shaft 90 at step 306, transmitting power through the drive system components to move mixing element(s) 40. Once the speed signal of the transmission 80 (or other speed sensing source) becomes greater than the specified minimum speed signal for clutch engagement as determined in step 308, control unit 10 automatically shifts transmission 80 to a subsequent higher gear at step 310.

Control unit 10 will now recognize the user is in a "loading" section of the custom cycle, and control panel 104 will prompt the user to actuate a control panel input 108 when the first user settable gear downshift point is desired. At step 312, the user then begins loading mixing chamber 20 with ingredients based on the desired batch recipe. At step 314, as each ingredient is added, the user can manually increment the current ingredient number registered by control unit 10 or in at least some embodiments, scale indicator 105 can send a command to increment the ingredient number registered, this step runs concurrently with step 316. At step 316, when a desired gear downshift point (speed range change) for the custom cycle is met (this point occurs when a downshift is desired to prevent overtaxing the drive system for feed mixer 12), when desired, the user actuates control panel input 108, and the control unit 10 saves the current ingredient number as a first shift point value, which is stored in the control unit 10 as the registered indicator value for "shift point 1". For example, if the user chose to shift during the loading of the second ingredient, the number "2" would be registered as the indicator value for shift point 1. When the current ingredient number registered by the control unit 10 reaches the last ingredient, which should equal the value that was originally entered as the total number of ingredients, then at step 318 the control unit 10 will recognize this last ingredient as the last step in the loading process. Alternatively, at step 318, the user can actuate an input on control panel 104 to indicate the final ingredient has been added and the feed is ready to be unloaded. It is noted that the storage of ingredient numbers, indicator values, shift points, etc., as well as various other parameters discussed herein, can be provided by one scale indicator 105, as well as one or more memory portions 112, 115, as utilized by control program 117, although in some embodiments, other methods of storage can be utilized.

Once the mixing process is completed at step 318, at step 320 the user may then move feed mixer 12 to an unloading location, where the user begins discharging the batch recipe of feed 100 from mixing chamber 20. As the feed 100 exits mixing chamber 20, transmission 80 can remain in the same gear until the user finishes the unloading process. To increase the unloading speed of the mixing element 40, the user can manually shift transmission 80 to the next higher speed range (gear) by pressing an input on control panel 104. Once the feed 100 has been fully unloaded, the user will disengage PTO shaft 90 at step 326. When the speed signal from control box 101 is sensed below a specified minimum stop speed in step 328, it causes control unit 10 to recognize that the Cycle Learning Mode is complete for the specified cycle name (e.g., Dairy Ration) at step 330. The user may now program more Custom Automatic Control Modes in the same fashion as described above.

Figure 4:
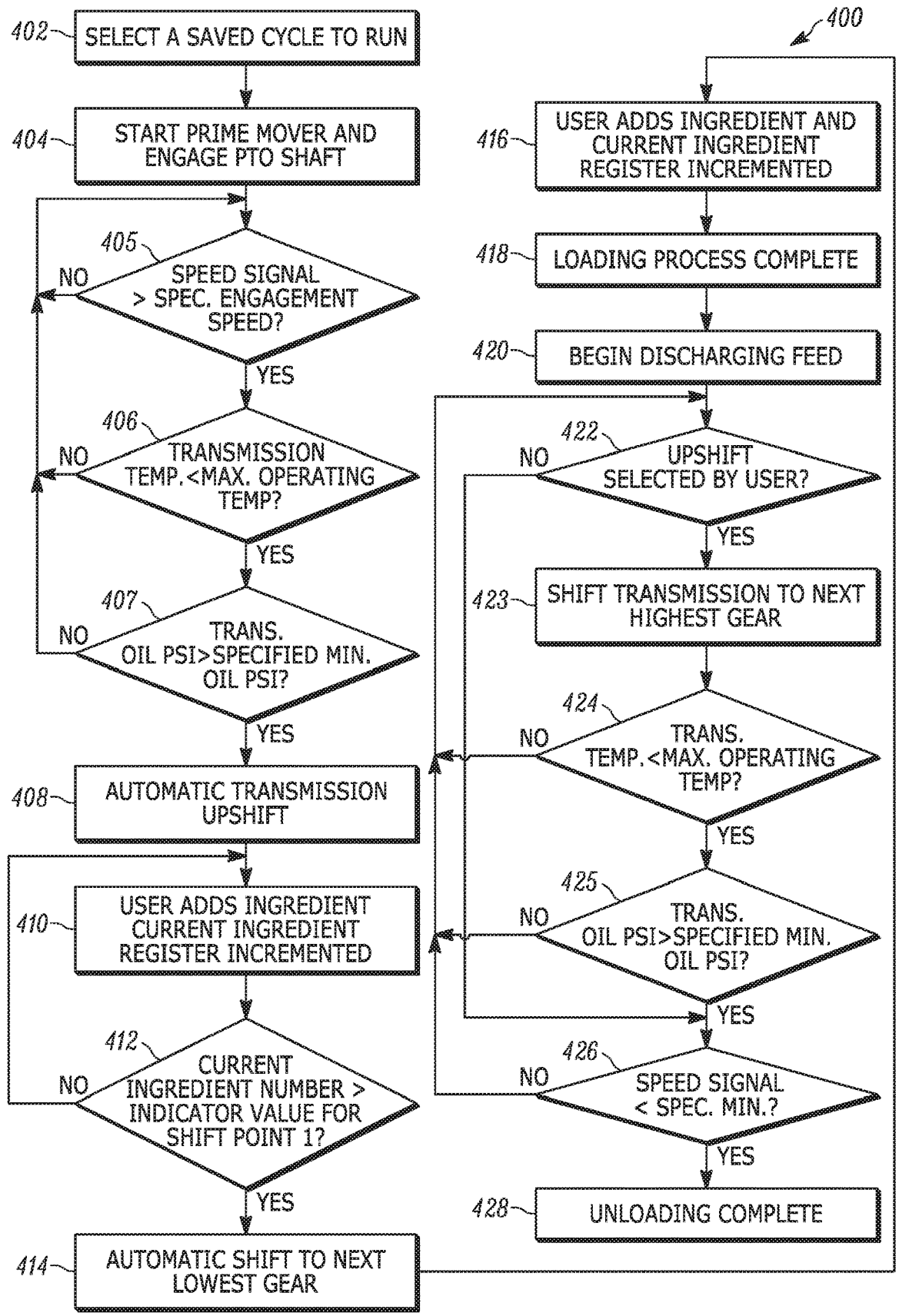
FIG. 4 is a flow chart illustrating an exemplary process for operating the feed mixer in the Custom Automatic Control Mode.

With one or more saved custom automatic control cycles completed, the user may now operate in Custom Automatic Control Mode by using control panel 104 to select a saved cycle, for example Dairy Ration. Flow chart 400, shown in FIG. 4, provides an exemplary process for operating feed mixer 12 in Custom Automatic Control Mode. Beginning at step 402, the user selects the desired cycle from a listing of stored automatic control cycles displayed on control panel 104. At step 404, the user would start the loading process by starting prime mover 70, and engaging PTO shaft 90 to transfer power through the drive system components to start moving mixing element 40. Once the speed signal provided to control box 101 from the transmission 80, or other speed sensing component (as discussed above), communicates a value greater than the specified minimum speed for clutch engagement at step 406, then control unit 10 sends a command to automatically shift transmission 80 to the next higher gear at step 408 and control unit 10 recognizes the user is in the loading phase of the custom cycle. In step 410, the user adds an ingredient and at least one of the user and the scale indicator 105 (via an output) increments the current ingredient register value using input 108 on control panel 104. In step 412, control unit 10 monitors the registered current ingredient, as it is incremented. Once the registered current ingredient signal value goes above the first registered indicator value for shift point 1, then control unit 10 automatically shifts transmission 80 to the next lower speed range (gear) at step 414. The user continues loading mixing chamber 20 with ingredients, and incrementing the registered ingredient number on control panel 104 accordingly in step 416, until the loading process is complete at step 418.

Once all the ingredients are added and mixed together in feed mixer 12, the result is mixed feed 100. The user may then move feed mixer 12 to an unloading location, and begin discharging feed 100 from mixing chamber 20 at step 420. As feed 100 exits mixing chamber 20, the user will be able to manually shift transmission 80 to a higher speed range (gear) at step 422, if so desired, by actuating control panel input 108, which sends a command to shift the transmission 80 to the next highest gear at step 424. At step 426, the control unit 10 checks if the sensed speed signal is less than the specified minimum speed signal, indicating that unloading is complete, and at step 428, control unit 10 recognizes that the custom cycle Dairy Ration is finished. If at step 426 the speed signal is greater than specified minimum, the process returns to step 422 to monitor if an additional upshift has been selected by the user.

An additional embodiment of implementing the Custom Automatic Control Mode includes all elements and procedures as described above, with the addition of accepting unloading points from scale indicator 105. Unloading points are commonly found in scale indicators to indicate to a user how much of an ingredient (ration) should be delivered to a certain location (e.g., animal pen). The scale indicator 105 can automatically dictate and increment which pen is being unloaded based on programmed parameters unique to scale indicator 105. These unloading points will provide a discrete input to control unit 10 from scale indicator 105 during the unloading process that can be used as a secondary "shift point 2". This shift point 2 automatically shifts (change speed range) transmission 80 to a higher speed range (gear) once the user defined unloading point is reached, indicating that less feed 100 is in mixing chamber 20. As such, this may be incorporated into the process of flowchart for example, in place of or in addition to step 422, which provides a manual upshift by the user. It is to be noted that all "pre-determined" values discussed herein can be considered "acceptable", wherein the term "acceptable" is understood to include operational values that are derived based on the operational limitations as specified by a manufacturer of the component, or otherwise derived based on reasonable expectations of safe operational parameters by a person skilled in the art of manufacturing feed mixers or the associated components.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein. In addition, the steps described herein can include additional steps and/or deleted steps, as well as be performed in other sequences.

What is claimed is:

1. A feed mixer apparatus comprising:
   a mixing chamber for receiving feed material, and having a mixing element situated therein for mixing the feed material;
   a transmission having a plurality of gears and sensors, the transmission connected with the mixing element;
   a control unit having a display and a plurality of control panel inputs, wherein the control unit is in at least indirect communication with the transmission and the sensors, and wherein the control unit is configured to receive a plurality of outputs from one or more of the transmission and sensors, and based at least in part on the plurality of outputs, provides an output command to effectuate a gear change in the transmission, and wherein the control unit includes a processor, a memory, and a control program; and
   a scale indicator configured to provide signals representative of a user-selected recipe, a current ingredient within the selected recipe, and a user-selected animal pen for receiving a distribution of feed material.

2. The apparatus of claim 1, wherein the transmission receives rotational power from a power-take-off shaft of a prime mover and outputs power from the transmission to at least one angular gearbox, via a driveline, and wherein the angular gearbox drives at least one of the plurality of mixing elements to provide rotational movement thereof.

3. The apparatus of claim 2, wherein the control unit includes a control box situated adjacent the transmission outside of the prime mover and a controller situated inside the prime mover for access by an operator of the prime mover.

4. The apparatus of claim 2, wherein the plurality of outputs received at the control unit include a transmission temperature sensor signal, a transmission pressure sensor signal, and a transmission speed sensor signal, and wherein the transmission receives a signal to shift to a different gear based at least in part on the result of the temperature sensor signal, the pressure sensor signal, and speed signal.

5. The apparatus of claim 1, wherein the sensors of the transmission include a speed sensor for communicating a speed signal to the control unit, and wherein the control unit provides an output to the transmission to change gears, based at least in part on the speed signal.

6. The apparatus of claim 1, wherein the plurality of control panel inputs includes a total number of different ingredients to be loaded into the mixing chamber for a specified batch recipe.

7. The apparatus of claim 6, wherein the plurality of control panel inputs includes an indication of which number of the different ingredients is being loaded into the mixing chamber at a given time.

8. The apparatus of claim 7, wherein the plurality of control panel inputs includes an indication to store a registered indicator value for a transmission shift based on which number of the different ingredients is being loaded.

* * * * *